Sept. 7, 1954
M. L. LOCKHART
2,688,325
PISTON PLUG WITHDRAWAL LIMITING MEANS FOR
HYPODERMIC SYRINGE DEVICES AND THE LIKE
Filed Sept. 12, 1952
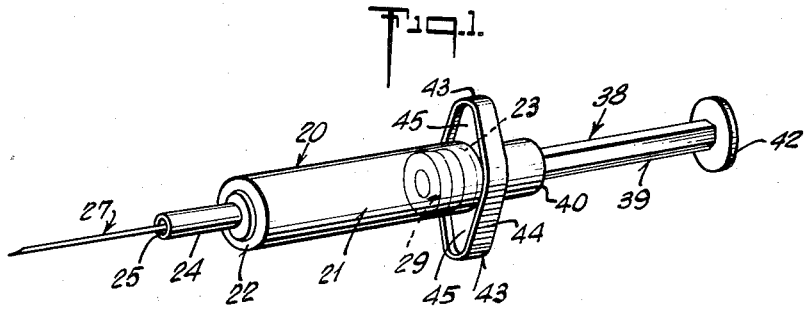
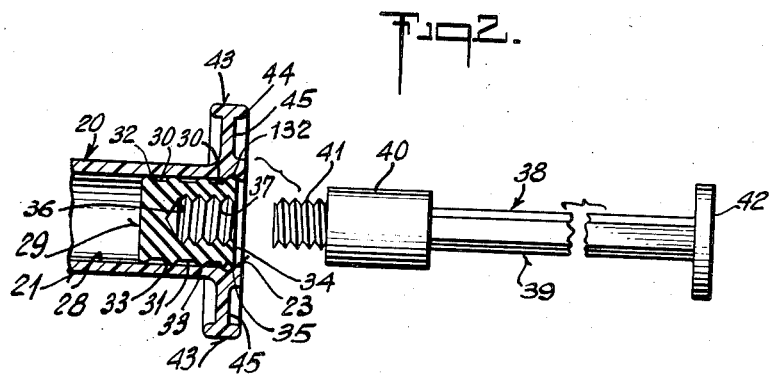
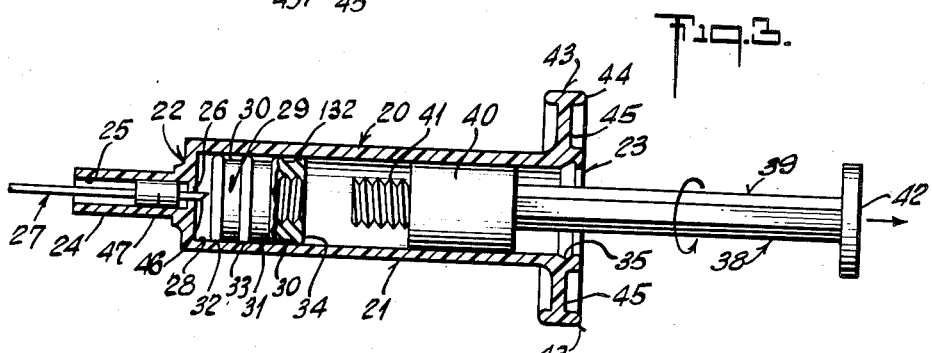
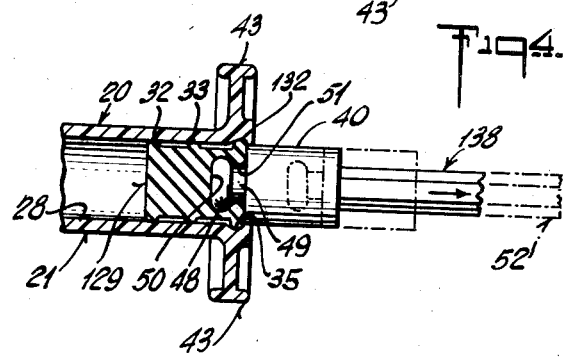
INVENTOR:
MARSHALL L. LOCKHART.
BY
Watson Johnson Leavenworth & Blair
ATTORNEYS.

Patented Sept. 7, 1954

2,688,325

UNITED STATES PATENT OFFICE 2,688,325

PISTON PLUG WITHDRAWAL LIMITING MEANS FOR HYPODERMIC SYRINGE DEVICES AND THE LIKE

Marshall L. Lockhart, Rutherford, N. J., assignor to The Compule Corporation, Rutherford, N. J., a corporation of New Jersey Application September 12, 1952, Serial No. 309,303

7 Claims. (Cl. 128—218)

The present invention relates to hypodermic syringes and similar devices featuring reciprocative piston plugs in barrel structures. More particularly, it relates to means in such devices for inter-engagement between plug and barrel structure to limit withdrawal of the former from the latter in a rearmost position.

A general object of the present invention is to provide such devices and parts thereof which are of simple construction, permitting ready production on an economical commercial basis, and which are easily assembled and permit efficient use of the assembled devices; such devices embodying simple means for engagement of elastic piston plug structure into barrel recess means to limit withdrawal of the plug from the barrel. If desired, the plug withdrawal limiting means may be employed to advantage in connection with disengaging connection between such plug and piston stem means which holds the latter together less securely than the plug is held in said barrel by said plug withdrawal limiting means, whereby the plug effectively may be anchored in the barrel to allow rapid disengagement of the piston stem means from the plug.

A more specific object of the present invention is to provide in such devices substantially cylindrical barrel means having in the inside surface thereof, preferably in the vicinity of its open rear end, a recess such as an annular groove into which may swell elastic side projecting means such as an annular rib on a piston plug, preferably made from elastic material, to limit withdrawal of the latter; said elastic plug being provided, if desired, with a constricted recess in the rear end thereof into which may be engaged an enlarged end portion on a piston stem to permit reciprocation of the former by the latter, said plug withdrawal limiting means permitting rapid dismounting of the stem from the plug by snap disengagement.

A still further object of the present invention is to provide unique structural embodiments of such devices which are readily and economically constructed on a commercial scale and which permit efficient use, operation and functioning thereof.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

Fig. 1 is a perspective view of an embodiment of the device of the present invention, including a barrel having a neck at one end in which is mounted temporarily a hollow needle or cannula, the barrel being closed at its other end by a piston plug to which a pistom stem is temporarily attached;

Fig. 2 is an enlarged sectional view, with parts broken away, of the rear end of the barrel structure shown in Fig. 1, showing the piston stem in side elevation with parts thereof broken away and detached from the piston plug;

Fig. 3 is a view similar to Fig. 2 but showing substantially all of the barrel structure in section with the piston plug slid forward to the position of substantially complete expulsion of contents, and illustrating disengagement of the stem from the plug; and Fig. 4 is a view similar to Fig. 2 illustrating a modified form of means for temporarily attaching the piston stem to the piston plug, but with the detached position being illustrated in dot-dash lines and the attached position being shown in full lines.

In the drawing, like numerals identify similar parts throughout. It will be seen therefrom that embodiments of the present invention and parts thereof are adapted to hypodermic syringe and blood sampling devices of the types disclosed in my copending application Serial No. 309,421, filed September 13, 1952, and entitled "Aspirating Hypodermic Syringe and Blood Sampling Devices," and to modified forms of ampule structure shown in my copending applications Serial Nos. 202,333, now Patent No. 2,625,157, 250,703 and 257,838, respectively filed December 22, 1950, October 10, 1951 and November 23, 1951. The various devices and embodiments thereof illustrated in the present drawing show, by way of example, how piston plug withdrawal limiting means of simple but unique design may be incorporated in such structures and how that feature may be used to advantage in combination with certain types of piston stem and piston plug engaging means for facilitating rapid disengagement thereof.

An embodiment of the present invention, as illustrated in Figs. 1 to 3 incl., may be in the form of a container 20 preferably formed of molded plastic. Such container 20 may, if desired, be formed of elastic plastic material, such as substantially transparent polyethylene composition. The container structure 20 includes a substantially cylindrical section 21 closed at one end by head portion 22 and having a substantially open rear end 23.

The head portion 22 provides a closing cross wall which coaxially carries a projecting hollow neck 24 having a substantially cylindrical bore 25 closed off at its inner or bottom end by a diaphragm 26, as is best seen from Fig. 3. Diaphragm 26 forms the central portion of the cross wall provided by head 22. The hollow neck 24 may slidably receive a needle assembly 27, such as any of those illustrated in Figs. 1 to 7 incl., of my copending applications Serial No. 202,333, now Patent No. 2,625,157, and Figs. 1 to 25 incl. of Serial No. 250,703, or any other suitable needle unit or assembly adapted to mounting on or in this container neck. Those double-ended needle assemblies provide suitable means for puncturing the diaphragm 26 to communicate the needle bore with the chamber provided interiorly of container 20. Such chamber 28 is defined by cylindrical side wall 21, the closing head 22 with its diaphragm 26, and a piston plug 29 which closes off the open back end 23 of the barrel.

Piston plug 29 preferably is a substantially cylindrical body of elastic material, such as a suitable rubber or rubber-like composition, and preferably is provided with a plurality of axially-spaced, annular grooves 30, 30 and 31 to define axially-spaced, circumferentially-extending, expandable and contractable front and rear end ribs 32 and 132, and intermediate ribs 33, 33, as shown in Figs. 2 and 3. For the purpose of providing interlocking engagement between the piston plug 29 and the barrel 21, preferably in the vicinity of its rear end 23, other suitable equivalent expandable and contractable projecting means may be provided on the side of the piston plug, but an elastic annular rib, such as the rear end rib 132 on the back end 34 of the piston plug 29, is preferred for simplicity and ease of formation.

For the purpose of interlocking cooperation with the expandable and contractable projecting portion on the side of the piston plug 29, preferably in the form of rear annular rib 132, the inside surface of the barrel is provided with recess means, preferably in the form of an annular groove 35, as best seen in Fig. 3. The outer diameter of piston plug 29, or at least that of its annular ribs 32, 33 and 132, is preferably appreciably greater than the internal diameter of the cylindrical barrel section 21 and also of the withdrawal-limiting, anchorage groove 35 formed in the rear end 23 thereof. Thus, when piston plug 29 is inserted in the rear end of the barrel substantially to the position indicated in Fig. 2 with its rear end rib 132 aligned with the barrel groove 35, that rib expands or swells into that groove to form interlocking anchorage of the piston plug in the barrel limiting its withdrawal under normal sliding force, for a purpose to be more fully explained hereinafter.

Piston plug 29 preferably has an axially-extending socket 36 provided in its rear end 34, as best seen in Fig. 2, and in the preferred form such socket is provided with a helical female thread 37 which forms a constriction having a plurality of axially-spaced turns. For the purpose of sliding piston plug 29 back and forth in barrel chamber 28, suitable piston stem means 38 are provided. Such stem means may be in the form of an elongated member or stem 39 having a guiding head portion 40 at one end provided with an externally-threaded stub 41, and at the other end a thrust plate 42 adapted to be engaged by an operator's finger. Stub 41 is adapted to be threaded into internally-threaded plug socket 36. Thus, the helical male thread of stub 41 forms an enlargement having a plurality of axially-spaced turns. It will be understood that due to the elasticity of plug 29 when it is free from lateral confinement, the externally-threaded stub 41 of piston stem 39 may be forcibly telescoped into or snapped out of the internally-threaded socket 36, without requiring relative rotation for threaded engagement and disengagement due to the expandability of the walls of the plug socket. However, stem stub 41 preferably may be mounted into the plug socket 36 by threaded engagement, particularly when the plug is laterally confined, such as by the barrel side walls.

Since piston plug 29 is to be pushed forward into the chamber 28 for expulsion of liquid contents if the device is to be used for hypodermic administration of contained medicinal liquid or injective medicament, and/or pulled backward for aspiration or suction withdrawal of a blood sample, depending upon the use to which the device is to be put, suitable means are provided for secure finger engagement of the barrel 21. Such engaging means may be provided on the container 20 in the form of a pair of diametrically-opposed, laterally-extending wings 43, 43, preferably provided as integral parts of the container structure when molded as a unitary body. The finger-engaging wings 43, 43 may thus be formed as protruding portions of a circumambient oblong ring 44 attached to the container proper by lateral webs 45, 45, as best seen in Figs. 1 and 2.

In operation of the device illustrated by way of example in Figs. 1, 2 and 3, let it be assumed that the head wall 22, including its diaphragm 26, closes off the head end of the barrel and piston plug 29 closes off the rear end thereof so as to seal in chamber 28 a quantity of medicinal liquid intended to be subcutaneously administered in a single dosage. Such a structure may constitute a single-dosage, loaded ampule supplied in lots of any desired number, accompanied by a single piston stem means 38 and a suitable needle assembly 27 to be successively used therewith. In order to bring the needle bore into communication with the chamber 28, the diaphragm 26 may be pierced by needle stub 46 extending from the inner end of needle hub 47 slidably received in neck bore 25, as indicated in Fig. 3. The externally-threaded, piston stem stub 41 will be threaded into the piston socket 36 and the chamber contents may be expelled through the needle bore by application of thrust on the stem plate 42.

Should it be desired to aspirate such loaded hypodermic syringe device other than by flexing flexible side walls of the elastic barrel section 21, one may slightly withdraw the piston plug 29 after it has been thrust forward a short distance. As piston plug 29 is withdrawn to the full line position shown in Fig. 2 during such aspiration, its rear rib 132 will expand or swell into the internal barrel groove 35 to effect interlocking engagement and plug anchorage; thereby limiting withdrawal of the piston plug so that it will not be accidentally completely withdrawn from the barrel during such aspiration.

After the hypodermic syringe device of Figs.

1, 2 and 3 has served in the hypodermic administration of its liquid contents with forward thrust of the piston plug 29 substantially to the full line position indicated in Fig. 3, the piston stem unit 38 may be removed for use with another such ampule. Rotation of the stem 39 threadably will disengage the threaded stub 41 from the threaded socket 36, as is illustrated in Fig. 3; but if piston plug 29 is retracted and held anchored in the barrel as described the stem may be disengaged therefrom more quickly in the manner hereinafter described. The used ampule may then be discarded after removal of the needle assembly 27 from its neck 24, so that the needle assembly and the piston stem may be mounted on another loaded ampule for similar hypodermic use.

If it is desired to use such a construction for the purpose of taking a blood sample, the container 20 preferably will be provided with its chamber 28 empty, i. e., containing only gaseous medium, such as sterile air. It will be fitted with a suitable needle assembly 27 and stem means 38 by the operator in the manner indicated above. The piston plug 29 will then be thrust forward in the barrel chamber 28 substantially to the full line position indicated in Fig. 3 adjacent its pierced diaphragm 26 to expel the contained air. With the needle bore in proper communication with a patient's vein the piston plug 29 will be retracted in the barrel chamber 28 by withdrawal of the piston stem means 38 until it reaches substantially the full line position indicated in Fig. 2. In such position, the rear piston plug rib 132 is brought to alignment with the barrel groove 35, into which it expands or swells to form interlocking engagement so as efficiently to limit piston plug withdrawal. During such piston plug retraction, suction is created in the barrel chamber 28 to draw a blood sample thereinto. The interlocking engagement between the piston plug and the barrel by means of the swelling of the piston plug rear rib 132 into the barrel groove 35 effectively prevents excessive piston plug withdrawal of a degree which might cause complete withdrawal of the piston plug out of the open back end 23 of the barrel.

In either of such uses of the embodiment of the device shown in Figs. 1 to 3 incl., the interlocking engagement between the piston plug and the barrel of the present invention may also serve another advantageous use. It may facilitate disengagement of the piston stem means from the piston plug. For this purpose, the dimensions of the various parts, including the threaded engagement between the stem and piston plug, are such that it will require less force to snap the stem stub 41 out of the piston socket 36 than is required to contract the swelled or expanded rear piston rib 132 sufficiently to permit it to pass rearward beyond the anchoring groove 35. Thus, as piston plug 29 is retracted in barrel chamber 28 substantially to the full line position indicated in Fig. 2, its rear annular rib 132 snaps into the barrel anchorage groove 35 and then the piston stem stub 41 will be snapped out of the piston socket 36. Outward pull on the piston stem 39 is believed to cause the sloped surfaces of the threads of stem stub 41 to cam against the sloped surface of the socket threads 37 so as to apply lateral expanding force to the socket side walls. This camming action appears to seat the plug rear rib 132 more securely into the barrel anchorage groove 35 so as to assure effective anchorage of the piston plug in the rear end of the barrel as sufficient pull is applied to the piston stem means 38 to snap its engaging end or stub 41 out of the plug socket 36. Further, the provision of a plurality of axially-spaced ribs on the sides of the piston plug 29 may give further assurance that the piston plug will not be accidentally completely withdrawn from the rear end of the barrel since if one should by excessive force be pulled past the anchorage groove 35, the next succeeding rib should swell thereinto to duplicate the anchoring interlock.

Preferably, rear plug rib 132 is of a diameter slightly greater than the other plug ribs to assure such secure anchoring interlock. This does not interfere with forward thrust of the plug 29 in the chamber 28 since the rear rib 132 readily may be distorted backward with push on the plug since that rib is located at the plug rear end 34, to permit it to slide forward out of groove 35. To facilitate such forward disengagement while assuring secure plug anchorage on retraction the anchoring groove 35 may be formed with a sloping front side or forwardly extending annular surface and an abrupt blocking rear side or annular surface extending substantially normal to the barrel axis, as best seen in Fig. 3.

It is to be understood that, in the practice of the present invention, means other than threaded engagement may be employed for temporarily connecting the piston stem means to the piston plug. For example, as illustrated in Fig. 4, the head 40 of piston stem means 138 may be provided with an engaging member in the nature of an enlarged head 48 connected to the stem head 40 by a reduced neck 49, with that enlarged head engaged within a socket 50 having a constricted neck 51. The piston stem means 138 may be temporarily connected to piston plug 129 by snapping its enlarged head 48 into the socket 50 with the constricted socket neck 51 engaged about the stem neck 49.

In retracting the piston stem and plug assembly 138 and 129 in barrel chamber 28, rear plug rib 132 will be brought to alignment with the barrel anchorage groove 35 to permit it to swell thereinto, as indicated in Fig. 4, and in the manner described above. Thereafter, further pull on the stem means 138 will snap the enlarged head 48 out of the constricted plug socket 50 to free the stem, as indicated in dot-dash lines at 52 in Fig. 4. Thus, rapid snap disengagement of the piston stem from the piston plug may be had with equal facility in different structural embodiments, such as those illustrated in Figs. 1 to 3 incl., and in Fig. 4.

It will thus be seen that the objects set forth above, among those made apparent from the preceding description, are efficiently attained and, since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a piston type hypodermic syringe means, and the like, to limit withdrawal of piston means from barrel structure, the combination comprising; a substantially cylindrical barrel having a normally open rear end, an elastic piston plug slidably mounted in said barrel and having an expandable and contractable projecting portion on the side thereof, and engaging recess means in the inside surface of said barrel into which said projecting plug portion may swell when slid thereto temporarily to limit withdrawal of said plug from said barrel, said recess means having a sloping, forwardly-extending surface to facilitate slide of said swelled projecting portion thereoutof with forward travel of said plug and having an abrupt blocking rear surface extending substantially normal to the barrel axis against which said projecting plug portion will jam for so limiting plug withdrawal.

2. The structure as defined in claim 1 characterized by said projecting means being an annular rib and said recess means being an annular groove with a sloping, forwardly-extending annular side and an abrupt rear annular side between which said rib may swell.

3. In a piston type hypodermic syringe means, and the like, to limit withdrawal of piston means from barrel structure, the combination comprising; a substantially cylindrical barrel having a normally open rear end, an elastic piston plug slidably mounted in said barrel and having stem engaging means on the rear end thereof, stem means temporarily to be snap-engaged by said engaging means with the elasticity of said plug permitting such temporary snap engagement to allow forward and backward sliding of said plug in said barrel by said stem means, said elastic plug having an expandable and contractable projecting portion on the side thereof, and engaging recess means in the inside surface of said barrel into which said projecting plug portion may swell when slid thereto temporarily to limit withdrawal of said plug from said barrel, said withdrawal limiting means being adapted to hold said plug in said barrel more securely than said stem means is held to said plug to permit ready disengagement of the latter when said projecting plug portion swells into said recess means.

4. The structure as defined in claim 3 characterized by said stem engaging means being in the form of a socket having constricting means adapted to be snapped beyond enlargement means on the end of said stem means.

5. The structure as defined in claim 4 characterized by said socket constricting means being in the form of helical female threads threadably to engage with said enlargement means in the form of helical male threads on the end of said stem means.

6. In a piston type hypodermic syringe device, and the like, means to limit withdrawal of piston means from barrel structure comprising, in combination; a substantially cylindrical barrel having a normally open rear end, an elastic piston plug slidably mounted in said barrel and having an expandable and contractable annular flange on the side thereof, an annular groove in the inside surface of said barrel into which said projecting plug portion may swell when slid thereto to limit withdrawal of said plug from said barrel, said piston plug having a constricted socket in the rear end thereof, and piston stem means having an enlarged end adapted to be engaged into said constricted plug socket, the elasticity of said plug permitting ready snap disengagement of said stem end from out of said plug socket when said plug rib is engaged in said barrel groove.

7. In a piston type hypodermic syringe device, and the like, means to limit withdrawal of piston means from barrel structure comprising, in combination; a substantially cylindrical barrel having a normally open rear end, an elastic piston plug slidably mounted in said barrel and having an expandable and contractable annular flange on the side thereof, an annular groove in the inside surface of said barrel into which said projecting plug portion may swell when slid thereto to limit withdrawal of said plug from said barrel, said piston plug having an internally-threaded socket in the rear end thereof, and piston stem means having an externally-threaded end adapted threadably to be engaged into said plug socket, the elasticity of said plug permitting ready snap disengagement of said threaded stem end from out of said plug socket when sail plug rib is engaged in said barrel groove.

References Cited in the file of this patent

UNITED STATES PATENTS

| Number | Name | Date |
| --- | --- | --- |
| 1,771,219 | Hein | July 22, 1930 |
| 2,490,552 | Smith | Dec. 6, 1949 |